(12) United States Patent
Kania et al.

(10) Patent No.: US 7,941,970 B2
(45) Date of Patent: May 17, 2011

(54) COMBINATION-CELL FOAM FLOATING ISLAND

(75) Inventors: Bruce G. Kania, Shepherd, MT (US); Frank M. Stewart, Bozeman, MT (US)

(73) Assignee: Fountainhead LLC, Shepherd, MT (US)

( * ) Notice: Subject to any disclaimer, the term of this patent is extended or adjusted under 35 U.S.C. 154(b) by 0 days.

(21) Appl. No.: 12/777,960

(22) Filed: May 11, 2010

(65) Prior Publication Data

US 2010/0236149 A1 Sep. 23, 2010

Related U.S. Application Data

(62) Division of application No. 11/927,318, filed on Oct. 29, 2007, now abandoned.

(51) Int. Cl.
*A01G 9/02* (2006.01)

(52) U.S. Cl. .............................. 47/65.5; 47/59 S; 47/64

(58) Field of Classification Search .............. 47/64, 65.5
See application file for complete search history.

(56) References Cited

U.S. PATENT DOCUMENTS

| | | | |
|---|---|---|---|
| 2,639,549 A | | 5/1953 | Wubben et al. |
| 3,579,907 A | * | 5/1971 | Graves ............................. 47/17 |
| 3,703,786 A | * | 11/1972 | Swan ................................ 47/56 |
| 3,798,836 A | * | 3/1974 | Rubens et al. .................... 47/63 |
| 3,927,491 A | | 12/1975 | Farnsworth |
| 4,034,506 A | * | 7/1977 | Kasahara et al. ................. 47/64 |
| 4,037,360 A | | 7/1977 | Farnsworth |
| 4,086,161 A | | 4/1978 | Burton |
| 4,165,281 A | | 8/1979 | Kuriyama et al. |
| 4,292,760 A | * | 10/1981 | Krave ................................ 47/14 |
| 4,312,152 A | * | 1/1982 | Drury et al. ....................... 47/63 |
| 4,487,588 A | | 12/1984 | Lewis, III et al. |
| 4,536,988 A | | 8/1985 | Hogen |
| 4,930,253 A | * | 6/1990 | Todd, Sr. ........................... 47/65 |
| 5,106,504 A | | 4/1992 | Murray |
| 5,143,020 A | | 9/1992 | Patrick |
| 5,207,733 A | | 5/1993 | Perrin |
| 5,224,292 A | | 7/1993 | Anton |
| 5,261,185 A | | 11/1993 | Koide et al. |
| 5,309,673 A | | 5/1994 | Stover et al. |
| 5,312,601 A | | 5/1994 | Patrick |
| 5,337,516 A | | 8/1994 | Hondulas |
| 5,522,985 A | | 6/1996 | Bender et al. |
| 5,528,856 A | | 6/1996 | Smith et al. |
| 5,614,097 A | | 3/1997 | Bender et al. |
| 5,766,474 A | | 6/1998 | Smith et al. |
| 5,799,440 A | * | 9/1998 | Ishikawa et al. .................. 47/65 |
| 5,836,107 A | | 11/1998 | Behrens |

(Continued)

FOREIGN PATENT DOCUMENTS

KR 2003052942 A * 6/2003

*Primary Examiner* — Francis T Palo
(74) *Attorney, Agent, or Firm* — Antoinette M. Tease

(57) ABSTRACT

A floating island comprising a combination-cell thermoplastic foam. In a preferred embodiment, the invention is a floating island comprising: an island body comprising at least a first portion that comprises a combination-cell thermoplastic foam and having a cavity; and a bedding material that is disposed in said cavity; wherein said combination-cell thermoplastic foam is buoyant in water and permeable to gas and water. In another embodiment, the invention is a floating island comprising: an island body comprising a first matrix layer, a second matrix layer and a third matrix layer; and a gas-trapping insert that is disposed between two of said layers.

4 Claims, 9 Drawing Sheets

U.S. PATENT DOCUMENTS

| | | | |
|---|---|---|---|
| 5,836,108 A | 11/1998 | Scheuer | |
| 5,980,738 A | 11/1999 | Heitkamp et al. | |
| 5,992,093 A | 11/1999 | De Groot et al. | |
| 6,008,028 A | 12/1999 | Bender et al. | |
| 6,014,838 A | 1/2000 | Asher | |
| 6,033,559 A | 3/2000 | Bender et al. | |
| 6,086,755 A | 7/2000 | Tepper | |
| 6,555,219 B2 | 4/2003 | Kosinski | |
| 6,615,539 B1 | 9/2003 | Obonai et al. | |
| 6,946,496 B2 | 9/2005 | Mankiewicz | |
| 7,060,656 B2 | 6/2006 | Kato et al. | |
| 7,087,161 B1 | 8/2006 | Nishibori et al. | |
| 7,810,279 B2 * | 10/2010 | Kania et al. | 47/59 R |
| 2003/0051398 A1 | 3/2003 | Kosinski | |
| 2003/0208954 A1 | 11/2003 | Bulk | |
| 2005/0183331 A1 | 8/2005 | Kania et al. | |
| 2006/0243659 A1 | 11/2006 | Svirklys et al. | |
| 2009/0113793 A1 * | 5/2009 | Kania et al. | 47/65 |
| 2009/0165374 A1 * | 7/2009 | Kania et al. | 47/65.5 |
| 2010/0088956 A1 * | 4/2010 | Kania et al. | 47/65.5 |
| 2010/0236148 A1 * | 9/2010 | Kania et al. | 47/59 S |
| 2010/0236149 A1 * | 9/2010 | Kania et al. | 47/59 S |

* cited by examiner

COMBINATION-CELL FOAM FLOATING ISLAND

CROSS-REFERENCE TO RELATED APPLICATION

This application is a divisional of U.S. patent application Ser. No. 11/927,318 filed on Oct. 29, 2007. The contents of that application are incorporated herein by reference.

BACKGROUND OF THE INVENTION

This invention relates to floating islands. In particular, the invention relates to combination-cell foam floating islands.

The background art is characterized by U.S. Pat. Nos. 5,224,292; 5,528,856; 5,766,474; 5,980,738; 6,086,755; and 6,555,219 and U.S. Patent Application Nos. 2003/0051398; 2003/0208954; 2005/0183331; the disclosures of which patents and patent applications are incorporated by reference as if fully set forth herein.

Background art floating planters have four major deficiencies that are overcome in preferred embodiments of the present invention. Some background art planters are predominantly covered by materials that prevent or restrict plant growth. For example, the invention described by Tepper (U.S. Pat. No. 6,086,755) comprises a top floatation layer that is manufactured from a conventional buoyant foam such as a foamed plastic. This material is not suitable for plant growth; therefore, this invention requires cutouts to be installed through the foam layer, and plants can only grow through the cutouts. With the Tepper invention, only a portion of the top surface area of the planter is available for plant growth, which reduces the total plant growing capacity of the structure.

Other background art planters use hollow buoyant pipes that are installed around the perimeter of the structure to provide buoyancy. For example, Waterlines Solutions of the U.K. utilizes sealed polypropylene tubes around the perimeter of its floating planters to provide buoyancy. This method of providing buoyancy tends to be fragile (e.g., subject to failure by impact from boats and pressure from freezing ice) and expensive.

BRIEF SUMMARY OF THE INVENTION

The purpose of the invention is to provide an economical floating island. Some embodiments of the invention comprise a material (combination-cell thermoplastic foam) that has not been used in the background art. This material has several beneficial properties that require the use of multiple materials in the background art. The material provides buoyancy via the closed cells, water wicking and water adsorption via the open cells; it is penetrable by plant roots and resistant to chemical and sunlight degradation. When used under pockets of bedding soil, it prevents loss of soil while supporting root growth and providing buoyancy. The formulation of the combination-cell foam can be varied so as to produce a variety of foam products from the same resin stock, thereby reducing manufacturing costs.

Some embodiments of the invention are specifically designed to maximize the use of scrap materials, thereby reducing production costs and also converting waste products into environmentally beneficial products. Fastening devices have been improved over the background art to be more economical, stronger, and more efficient.

Utilization of combination open/close celled foam as a comprehensive one-material floating island solution allows for simplified, less expensive mass production. This, in combination with features like enhanced ultraviolet (UV) light protection, provides for a higher quality, more consistent product.

In summary, this disclosure describes improvements to the background art floating island technology embodied in products manufactured by Floating Island International, LLC, of Shepherd, Mont. The improvements described in this disclosure result in lower production costs for floating island products that perform as well or better than background art production models. The improvements include changes in construction materials and fabrication methods.

In a preferred embodiment, inexpensive and durable floating (buoyant) islands are made by replacing background art thermosetting (e.g., polyurethane) foam with thermoplastic (e.g., polypropylene, polyethylene, or ethylene vinyl acetate) foam. In preferred embodiments, the thermoplastic foam is comprised of a combination of open and closed cells, which provide benefits that are not present in foams that are comprised of either open cells alone or closed cells alone. Thermoplastic foams that contain both open and closed cells are preferably produced by an extrusion process that is similar to the ones used to produce both open cell foam and closed cell foam. By adjusting the manufacturing conditions such as foaming gas injection volume, extrusion temperature, and extrusion pressure, a portion of the gas bubbles break as they expand within the curing polymer, thereby producing open cells. The remaining portion of the gas bubbles remain intact as they expand, thereby producing closed cells. An example of a manufacturer of this "combination-cell" material is Nomaco Corporation of Zebulon, N.C. The open cells can absorb and wick water, and they allow easy penetration by plant roots and stems. The closed cells are gas-filled, thereby reducing the total weight of the sheet, and providing buoyancy when the material is submerged. The ability to include open and close cells in the same material at whatever ratio is desired eliminates several manufacturing operations that would otherwise be required to achieve a desired buoyancy in combination with an appropriate gas and water exchange rate within the body of a floating island.

In another preferred embodiment, the growth medium is contained by an underlayer of permeable foam sheeting. The sheeting is preferably comprised of thermoplastic (e.g., polypropylene, polyethylene, or ethylene vinyl acetate) foam. The pore spaces comprising the thermoplastic foam comprise a combination of open and closed cells.

In another preferred embodiment, the buoyancy and outer covering materials are rendered more resistant to degradation by sunlight and other environmental effects by the utilization of inert thermoplastic materials. In this embodiment, the buoyancy and outer covering materials are comprised of thermoplastic or thermoplastic foam. Both of these materials are relatively inert compared to other materials, such as thermosetting polymers. Inert materials do not react chemically with reactive materials such as water or petroleum products; therefore, they do not degrade when exposed to these materials. In addition, thermoplastic materials are generally more resistant to sunlight-caused degradation than thermosetting materials.

In another preferred embodiment, the entire island body is comprised of combination-cell thermoplastic foam. This embodiment is both buoyant and penetrable by plants.

In another preferred embodiment, the capillary wicking tubes of previous embodiments have been made more effective and less expensive by utilizing novel, pre-manufactured wicking cups filled with wicking growth medium.

In yet another preferred embodiment, the matrix is rendered self-buoyant and more durable by incorporating thermoplastic polymer shapes (shapes may include threads, rods, strands, tubes, strips, etc.) or thermoplastic polymer foam shapes. The shapes are preferably melted or bonded together with a binder to form a matrix. Thermoplastic foams may alternately be used in place of polyurethane foam to provide adhesion between matrix layers and/or buoyancy for the island. These shapes are preferably produced by an extrusion process, wherein plastic pellets are softened by increasing temperature and shear forces within a mechanical extruder. An expansion gas such as compressed iso-butane is injected into the softened plastic within the extruder. The softened plastic exits the extruder in a continuous stream through a nozzle. As the plastic exits the nozzle, the gas within the plastic expands and forms bubbles, producing closed cell foam. The foam cools sufficiently to set within a few seconds after exiting the nozzle. Although extrusion machines typically produce a continuous outlet stream, individual "shots" of foam may be produced by means of a shuttle valve that alternately shunts the stream of soft plastic back and forth between two or more outlets.

In another preferred embodiment, internal buoyancy is integrated within the island body by extruding uncured thermoplastic foam into the porous matrix. Examples of suitable thermoplastic foams include polyethylene, polypropylene and polyester foams. In this embodiment, the thermoplastic material expands and sets around at least some of the fibers of the matrix to form a volume of non-permeable closed cell foam within the island body. The density of the thermoplastic foam may be adjusted by varying the chemical formula of the resin, or by varying the application parameters such as the volume of expansion gas, the extruder temperature, and the extrusion rate. Practical densities of cured thermoplastic foam for the islands range from about 0.5 to about 25.0 pcf. By selecting a thermoplastic resin that has a lower melting temperature than the polyester fibers of the matrix, the molten thermoplastic foam can be injected into the matrix without inciting the polyester fibers. For example, a molten polyethylene foam at a temperature of 110 degrees C. can be injected into a polyester matrix that has a melting point of 150 degrees C.

In yet another preferred embodiment, uncured thermoplastic foam is continuously extruded onto a continuous layer of matrix that passes in front of the thermoplastic extrusion nozzle on a moving production line. The thermoplastic foam expands and sets to form a continuous strip of buoyant foam that is bonded to the matrix. The lengths of foamed matrix bodies are preferably cut into individual island shapes in a subsequent manufacturing operation. Optionally, two or more layers of matrix may be stacked with uncured foam introduced between them during the production operation, resulting in a multi-layer matrix with foam between the layers after the foam cures. In this configuration, the foam provides adhesion between joining layers as well as buoyancy.

In a further preferred embodiment, holes or strips are precut into the matrix, and molten thermoplastic foam is extruded into the precut voids, where it expands and sets. This technique may be preferred in cases where injecting the molten foam directly into the matrix results in poor quality foam due to the matrix fibers causing the foam bubbles to break during the expansion process, which could result in a less preferred foam that absorbs water and loses buoyancy.

In another preferred embodiment, pre-manufactured thermoplastic foam cylinders or other prismatic shapes are installed into precut cylindrical or other holes within the matrix, where they are retained by either a friction fit, or by melting, or via a mechanical pin device. In yet another preferred embodiment, pre-manufactured lengths of extruded foam rods or "noodles" are laid lengthwise between multiple layers of matrix, and the assembly is bonded by melting or by means of an adhesive or an adhesive foam or a mechanical pin device to form a "sandwich" with internal buoyancy provided by the foam noodles.

In another preferred embodiment, relatively small diameter foam noodles are pre-manufactured, and then used to form a buoyant matrix by bonding the noodles together via controlled melting, or by applying suitable adhesive such as latex binder, or by mechanically tangling the fibers to form a nonwoven blanket, or by weaving the fibers to form a woven blanket or by use of an adhesive foam, like polyurethane. Islands made from the buoyant matrix of this embodiment require less additional buoyancy in the form of discrete pieces of buoyant foam, and may be adequately buoyant for some island applications without any additional buoyancy components. The minimum diameter of commercially available noodles is approximately ¼-inch, but smaller diameter noodles (e.g., 0.05 inch) are technically feasible and may be preferred for making buoyant matrix. One example of a manufacturer of ¼-inch diameter polyethylene foam rods is Nomaco Corporation of Zebulon, N.C.

Buoyancy tests preformed by the applicants indicate that matrix made from ethylene vinyl acetate and polypropylene (without binder additives) is buoyant, while matrix made from polyester fibers with latex binder is not buoyant. Thus, nonwoven matrix made by melting the fibers together is buoyant; nonwoven matrix made with latex binder is not buoyant. If the fibers are made of foamed polymer, then the matrix is more buoyant than if it is made with the same material that is not foamed.

In another preferred embodiment, an inexpensive means is used to join buoyant units to the matrix. The inexpensive means preferably incorporates novel mechanical fastening pins.

Furthermore, modular units may be joined laterally or vertically by inexpensive mechanical fasteners, thereby providing a means for a standard-size product to be modified to any desired thickness and/or surface area.

In yet another preferred embodiment, scrap materials (both thermoplastic and thermosetting materials) are incorporated into the island body, thereby reducing costs and providing environmental benefits. This can be achieved by putting irregular shapes of scrap matrix or foam of any polymer type into a predetermined shape and either bonding with the adhesive means previously described, or sandwiching the scrap between non scrap sheets of nonwoven matrix, or alternatively, by passing scrap through a mechanical device, like a wood chipper, and producing a homogenous material characterized by a high level of surface area. This material is then used as a filler within predetermined island module shapes. Alternatively, this material can be baled much like straw or hay. Depending on the level of buoyant polymer that makes up the homogenous mix, such bales may be appropriately buoyant, or may require added levels of buoyancy.

In another preferred embodiment, wicking and buoyancy are incorporated into a single (e.g., thermoplastic) material that comprises a combination of open and closed cells, thereby reducing both material and construction costs, while improving floating island efficiency.

The buoyant foam that provides adhesion between layers as well as buoyancy for the structure is preferably comprised of an inert thermoplastic polymer, thereby reducing material costs and improving durability. In a first embodiment, conventional thermosetting polyurethane foam is used to bond the top, bottom, and sides of the matrix together, and closed cell or combination-cell thermoplastic foam (optionally, scrap foam) is used as a filler in the interior island space to provide inexpensive buoyancy for the floating island. In a second embodiment, thermoplastic foam is used exclusively to provide both adhesion and buoyancy for the floating island. If combination-cell thermoplastic foam is used, then plant roots can penetrate it.

A single type of material (thermoplastic foam) is preferably used for several purposes on a floating island, by varying the volumes and ratio of the open and closed cells that are produced during the extrusion of the foam material, thereby reducing material costs. For applications in which the primary objective is to maximize long-term buoyancy and root penetration is not required (e.g., injected buoyant units), then closed cell foam is preferred. Closed cell foam does not absorb water, and it has the most preferred long-term durability of thermoplastic foam varieties. For applications where wicking and water absorption are the primary objectives and buoyancy is not important (e.g., as a growth medium additive), open-cell foam is acceptable and may be less expensive to obtain than other foam types. For applications where wicking, buoyancy and root penetration are required (e.g., for submerged wicking cups), the combination-cell foam that contains a mixture of open and closed cells is preferred. The same thermoplastic resin stock may be used to produce all three varieties of foam.

Gas-impermeable inserts of various shapes (e.g., sheet or saucer-shaped) may be manufactured into the floating island body below waterline. These inserts trap gases on their undersides, thereby providing renewable, long-term buoyancy to the island.

In a preferred embodiment, the floating islands are manufactured so as to provide both aerobic and anaerobic zones within the same island. This renders the floating islands useful for a wide range of biological remediation applications.

By incorporating closed cell foam scrap within the body of a floating island, three objects are accomplished: more buoyancy, trapped gas at random within the island, and the creation of zones that can allow gas and water passage. This multiplicity of aerobic and anaerobic zones still allows for water to filter through the island, exposing aerobic and anaerobic microbes to various nutrients within the water. Applicants have learned that scrap foam and/or scrap or commercial quality combination open/close cell foam may be used at specific ratios and achieve the blend of buoyancy (based on close cell foam) with filtration, (based on open cell foam) to provide both buoyancy and appropriate filtration, inexpensively.

The required percentage of closed cell foam for an island is determined by the buoyancy requirements for the island. The closed cells within the foam are filled with trapped gas, and therefore provide buoyancy when submerged. Open cells within the foam become saturated with water when submerged, and do not provide buoyancy. For example, consider an island that is one foot thick, and having a foam component that is required to provide a buoyancy of 10 pounds per square foot of island surface area. Lightweight foam that is comprised entirely of closed cells provides about 60 pounds of buoyancy per cubic foot (pcf) of foam; therefore, 10 pounds of buoyancy will require about (10 lb./60 pcf)=0.17 cubic foot of closed cell foam per cubic foot of island matrix. In other words, the matrix must comprise 17% closed cell foam by volume. However, if the foam is combination-cell foam that is comprised of cells that are 50% closed and 50% open, then the matrix must contain twice as much combination-cell foam by volume (2×17%=34%) to achieve the required buoyancy of 10 pounds per square foot of island surface area, because the buoyancy is only provided by the closed-cell fraction of total cells within the foam. Similar calculations can be made for any combination of island thickness, desired buoyancy, and foam.

Gas impermeable inserts, in addition to being buoyant, may be shaped (e.g., in an upside down saucer shape) to trap bio-gas or other introduced gas underneath them, providing another low-cost buoyancy feature. All of these inexpensive buoyancy improvements reduce the need to rely on polyurethane, an expensive and potentially hazardous material. Instead of utilizing polyurethane for both buoyancy and adhesion, it can be used more sparingly, if at all.

In a preferred embodiment, the invention is a floating island comprising: an island body comprising a nonwoven plastic fiber matrix, said island body having a central cavity and a bottom having a plurality of holes; a shaped liner having a plurality of liner holes; a plurality of wicking cups that connect each said hole to each side liner hole, each said wicking cup having an outer layer and a central portion; and a growth medium that is disposed in said shaped liner and in each said central portion. Preferably, said island body is comprised of a nonwoven thermosetting or thermoplastic fiber matrix. Preferably, said growth medium is a wicking composition. Preferably, said growth medium comprises a hydrophilic polymer foam and a plurality of organic materials. Preferably, said outer layer comprises a combination-cell foam. Preferably, said shaped liner comprises a combination-cell foam.

In another preferred embodiment, the invention is a floating island comprising: an island body comprising at least a first portion that comprises a combination-cell thermoplastic foam and having a cavity; and a bedding material that is disposed in said cavity; wherein said combination-cell thermoplastic foam is buoyant in water and permeable to gas and water.

Preferably, the floating island further comprises: a second portion that comprises a matrix.

In yet another preferred embodiment, the invention is a floating island comprising: a buoyant matrix layer comprising a combination-cell thermoplastic foam; a grass sod layer that is disposed on said buoyant matrix material. Preferably, the floating island further comprises: a nonwoven matrix layer that underlies said buoyant matrix material. Preferably, said buoyant matrix layer is selected from the group consisting of: a thermoplastic polymer shape, a thermoplastic polymer foam shape, and a combination of the shapes.

In a further preferred embodiment, the invention is a fastening assembly comprising: at least two fastening pins, each of said fastening pins comprising a substantially U-shaped, stiff body having legs having notches; and a connecting cable that connects said fastening pins. In another preferred embodiment, the invention is a fastening unit comprising: a substantially U-shaped, stiff, planar body having a substantially flat top and legs having notches.

In another preferred embodiment, the invention is a combination comprising: a first floating island with an island body comprising a first combination-cell thermoplastic foam portion and a first matrix portion; a second floating island comprising a second combination-cell thermoplastic foam portion and a second matrix portion; and a fastening unit disclosed herein wherein one fastening pin is embedded in said first matrix portion and a second fastening pin is embedded in said second matrix portion.

In another preferred embodiment, the invention is a combination comprising: a buoyant matrix layer comprising a combination-cell thermoplastic foam; a grass sod layer that is disposed on said buoyant matrix material; a nonwoven matrix layer that underlies said buoyant matrix material; and a fastening unit disclosed herein embedded in at least two of said layers.

In another preferred embodiment, the invention is a floating island comprising: an island body that comprises a first combination-cell thermoplastic foam portion and having a cavity; a bedding material that is disposed in said cavity; a top cover that comprises a second combination-cell thermoplastic foam portion that is disposed on said island body; wherein said combination-cell thermoplastic foam portions are buoyant in water and permeable to gas and water.

In another preferred embodiment, the invention is a floating island comprising: an island body comprising a matrix top, a matrix bottom and matrix sides and having an interior portion; and a scrap material that is disposed in said interior portion, said scrap material comprising a combination-cell thermoplastic foam portion; wherein said combination-cell thermoplastic foam portion is buoyant in water and permeable to gas and water.

In yet another preferred embodiment, the invention is a floating island comprising: an island body comprising a first matrix layer, a second matrix layer and a third matrix layer; and a gas-trapping insert that is disposed between two of said layers, said gas-trapping insert being fabricated from a material selected from the group consisting of a combination-cell thermoplastic foam and a solid thermoplastic; wherein said combination-cell thermoplastic foam portion is buoyant in water and permeable to gas and water.

Further aspects of the invention will become apparent from consideration of the drawings and the ensuing description of preferred embodiments of the invention. A person skilled in the art will realize that other embodiments of the invention are possible and that the details of the invention can be modified in a number of respects, all without departing from the concept. Thus, the following drawings and description are to be regarded as illustrative in nature and not restrictive.

BRIEF DESCRIPTION OF THE SEVERAL VIEWS OF THE DRAWINGS

The features of the invention will be better understood by reference to the accompanying drawings which illustrate presently preferred embodiments of the invention.

Figure 1:
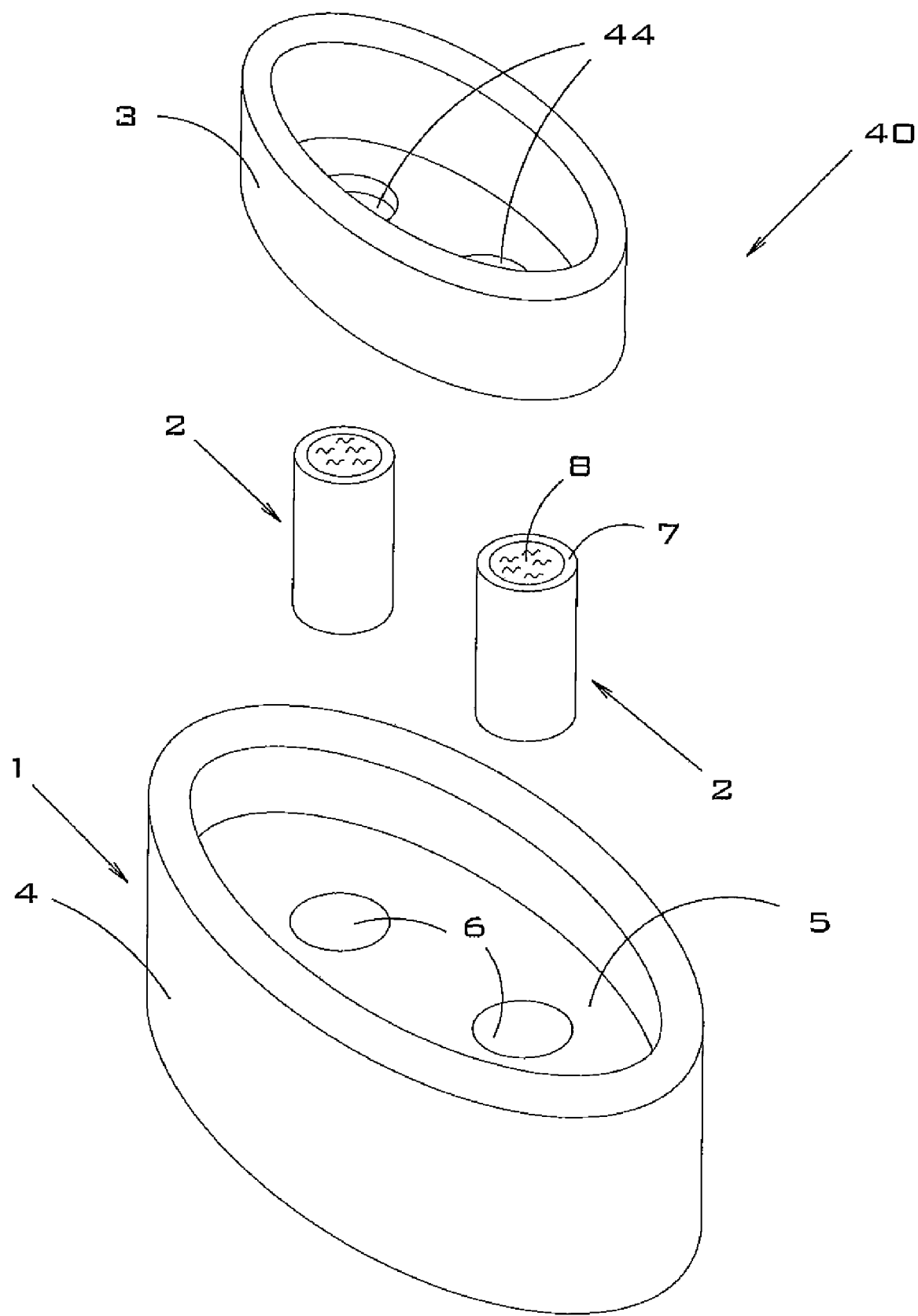
FIG. 1 is an exploded perspective view of a preferred embodiment of the invention that comprises wicking cups and a shaped liner for preventing the loss of growth medium.

The following reference numerals are used to indicate the parts and environment of the invention on the drawings:
1 island body
2 wicking cups
3 shaped liner
4 matrix
5 central cavity
6 cutout holes
7 outer layer
8 central portion
9 growth medium
10 plants
11 roots
12 water body
13 thermoplastic foam
14 bedding mix
17 grass sod layer, sod layer
18 buoyant matrix material, buoyant matrix layer
19 coarse nonwoven matrix material
20 fastening assembly
21 fastening pins
22 connecting cable
23 notches
24 fastening unit
26 thermoplastic foam top cover, top cover
27 matrix top
28 matrix bottom
29 matrix sides
30 scrap matrix
31 scrap open cell foam
32 scrap closed cell foam
33 scrap combination-cell foam
37 gas-trapping inserts
38 gas bubbles
40 floating island
42 bedding pocket
44 liner holes

DETAILED DESCRIPTION OF THE INVENTION

Referring to FIG. 1, a preferred embodiment of floating island 40 is illustrated that comprises island body 1, wicking cups 2 and shaped liner 3 for preventing the loss of growth medium. Island body 1 is preferably further comprised of a nonwoven thermosetting or thermoplastic fiber matrix 4 that has central cavity 5 and bottom cutout holes 6. Wicking cups 2 are preferably comprised of outer layer 7 and central portion 8. Central portion 8 is preferably filled with growth medium that has been formulated to have wicking ability.

An example of a suitable growth medium is BIOMIX® manufactured by Floating Island International of Shepherd, Mont. BIOMIX is a mixture comprising a hydrophilic polymer foam and a plurality of organic materials such as peat and bark.

Outer layer 7 is preferably comprised of thermoplastic polymer foam that has been manufactured specifically to have a combination of open cell and closed cell pore spaces within the polymer material (to comprise a combination-cell foam). The ratio of open to closed cell pores is set during the manufacturing process so that outer layer 7 has the ability to wick water via capillary action while retaining growth medium inside central portion 8. Shaped liner 3 is preferably comprised of thermoplastic polymer foam similar in composition to the material of outer layer 7. Shaped liner 3 preferably fits inside of island body 1, has liner holes 44 in its lower surface and is filled with growth medium 9.

Figure 2:
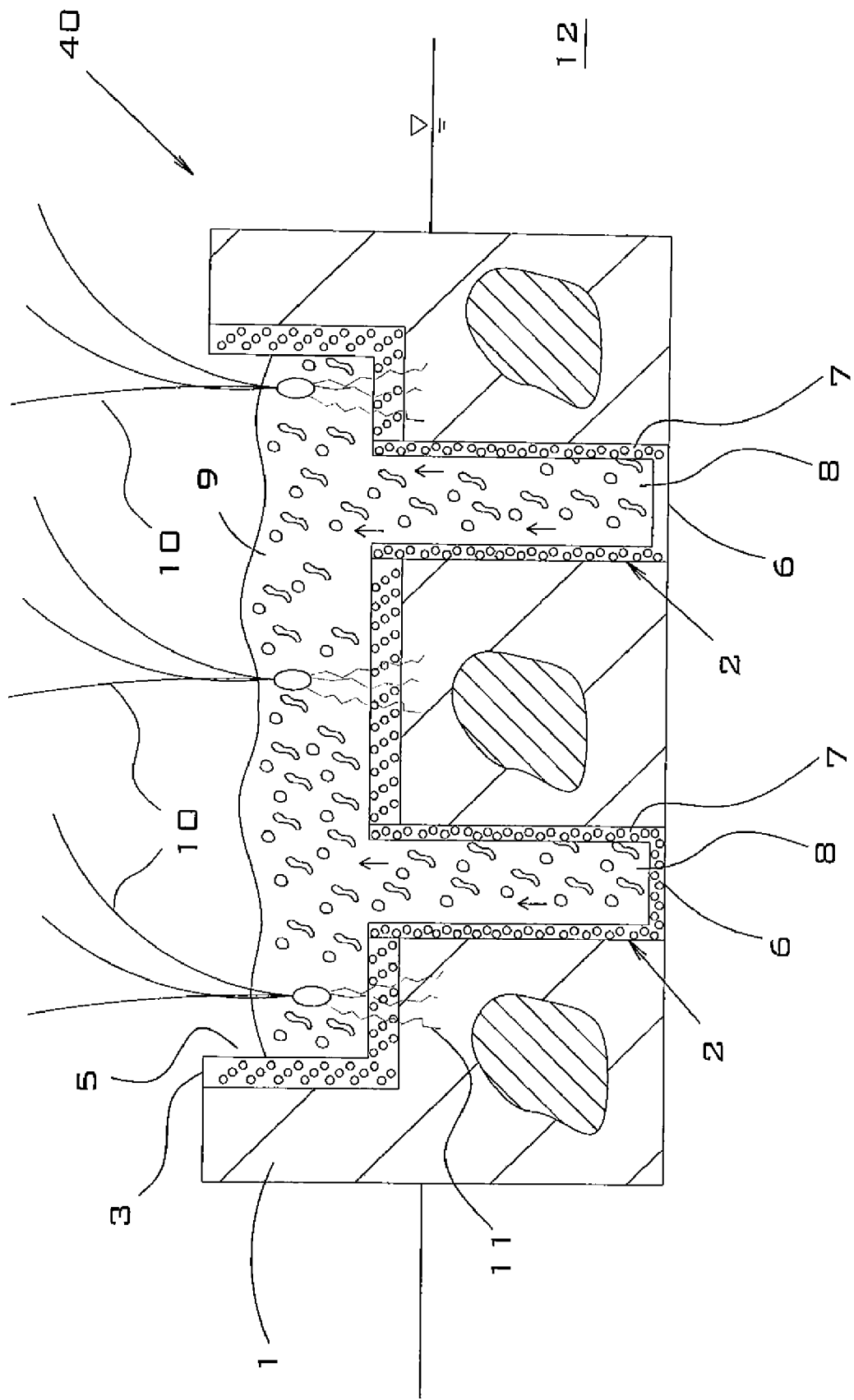
FIG. 2 is a side cross-section view of the embodiment of FIG. 1, after the island parts have been assembled and plants have become established.

Referring to FIG. 2, a side cross-section view of FIG. 1 is presented, showing a floating island 40 after the island parts have been assembled and plants 10 have become established. Wicking cups 2 are preferably installed into island body 1 via bottom cutout holes 6. Shaped liner 3 is preferably installed into central cavity 5 of island body 1. Shaped liner 3 is preferably filled with growth medium 9, and plants 10 are shown growing in growth medium 9. In this embodiment, roots 11 of plants 10 have grown through bottom of shaped liner 3, but growth medium 9 is retained within the interior of shaped liner 3. Water is transported upward via capillary action from water body 12 through outer layer 7 and central portion 8 of wicking cups 2, as shown by the arrows. This water then spreads laterally throughout growth medium 9 that is situation within shaped liner 3, and becomes available to plants 10.

Figure 3:
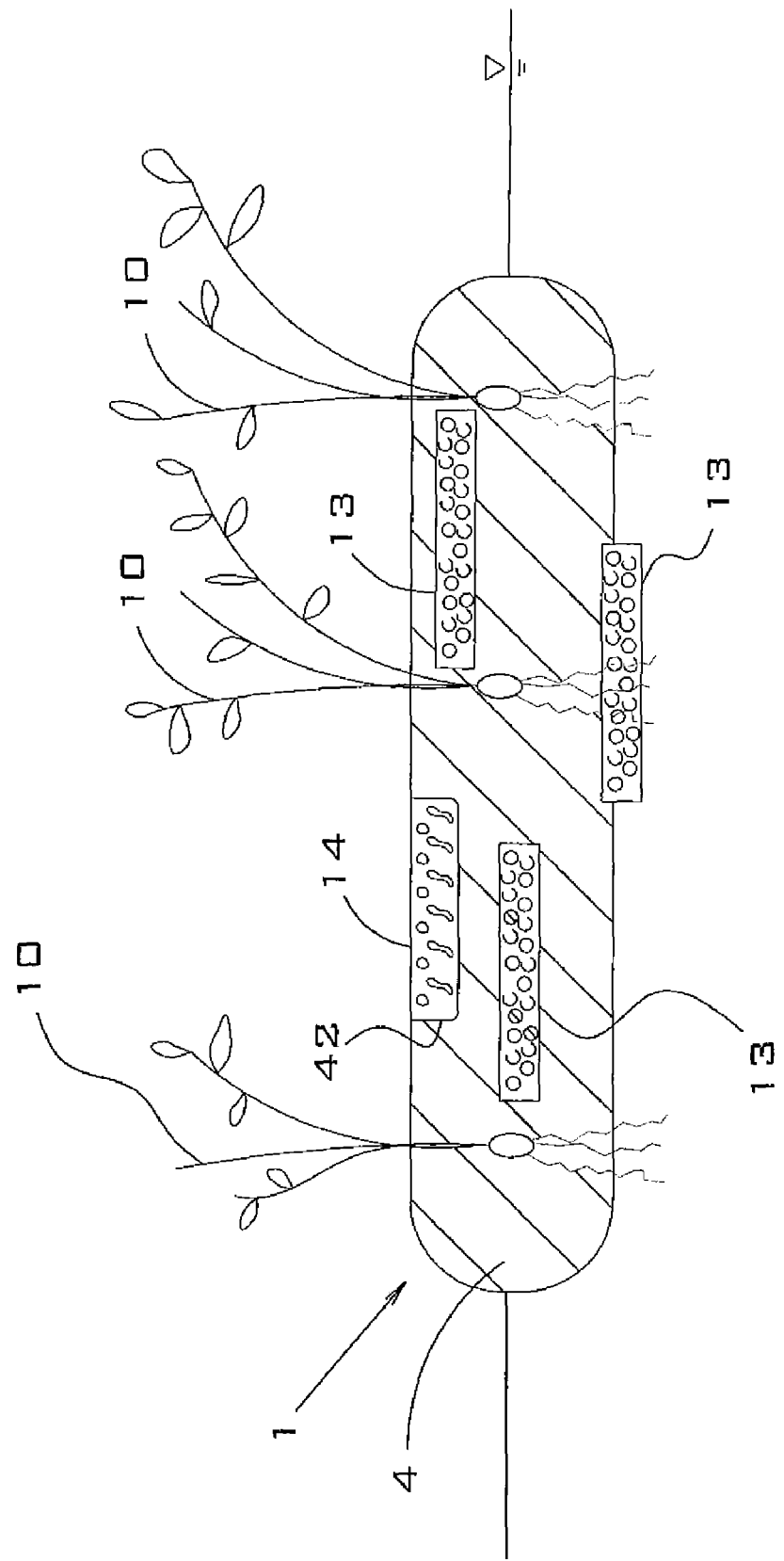
FIG. 3 is a side cross-section view of another embodiment of a floating island that comprises lost-cost materials.

FIG. 3 is a side cross-section view of another embodiment of a floating island that comprises lost-cost materials. As shown in FIG. 3, island body 1 is preferably comprised of matrix 4, pieces of thermoplastic foam 13 with a combination of open and closed cells, plants 10 and optional bedding pocket or cavity 42 filled with bedding mix 14. The pieces of thermoplastic foam 13 are preferably both buoyant in water and permeable to gases and water. One or more pieces of thermoplastic foam 13 may also act as a barrier to prevent particles of bedding mix 14 from falling through the bottom of bedding pocket 42. The pieces of thermoplastic foam 13 are preferably comprised of materials that are either thread- or sheet-shaped. The pieces of thermoplastic foam 13 are preferably penetrable by plant roots and can protect the roots from fish grazing if placed at the bottom surface of island body 1. Because the pieces of thermoplastic foam 13 are buoyant, they reduce the need for other buoyancy means. They also have a large internal surface area that is may be colonized by beneficial microbes. In a preferred embodiment, the microbes that colonize the interior of the pieces of thermoplastic foam 13 metabolize excess nutrients in the water and produce gases during metabolism. This metabolism has two benefits: water quality is improved as the nutrients are removed, and the gases provide ongoing buoyancy to island body 1.

Figure 4:
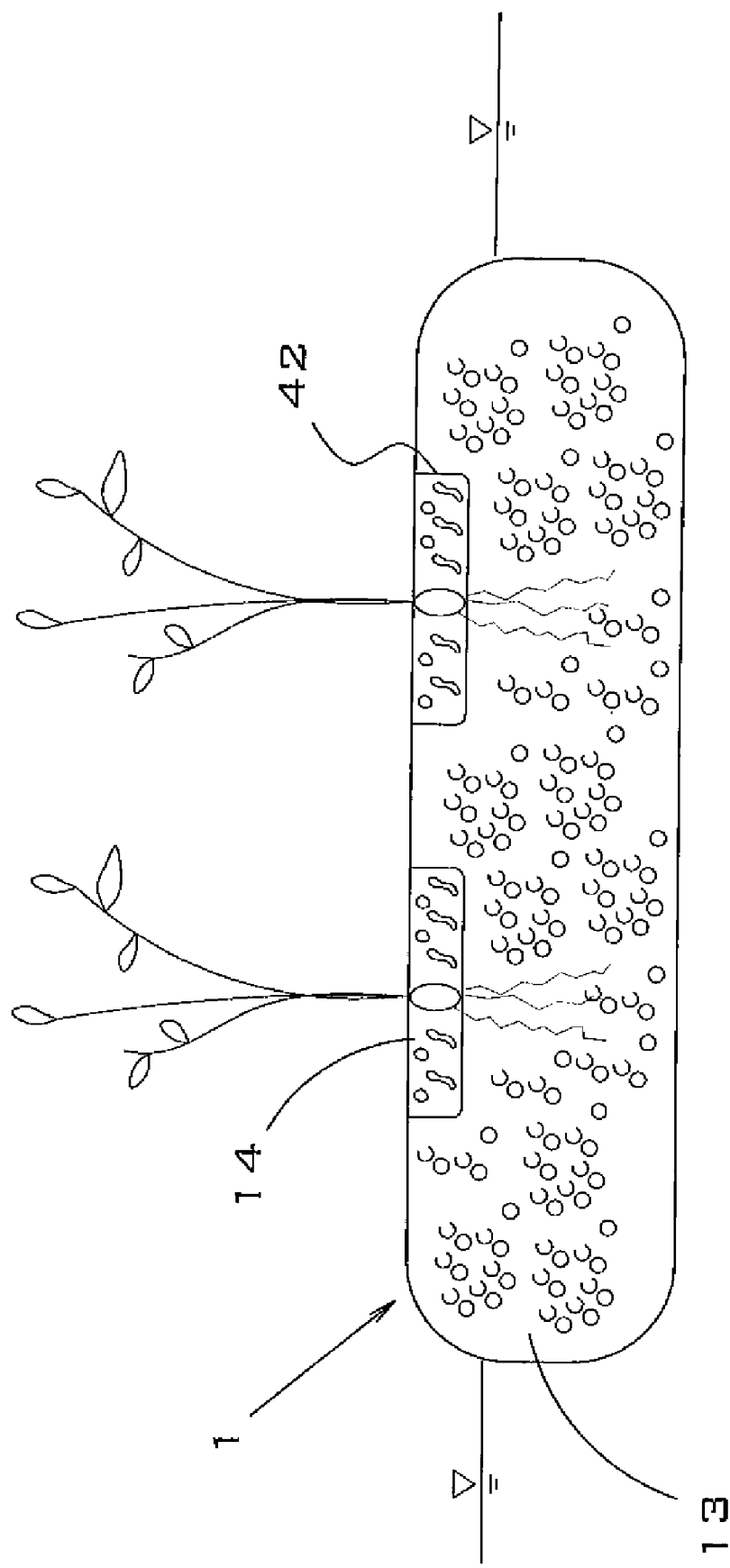
FIG. 4 shows a side cross-section view of another low-cost embodiment of a floating island in which the island body is comprised entirely of thermoplastic foam.

Referring to FIG. 4, another low-cost embodiment of floating island is presented in which island body 1 is comprised entirely of thermoplastic foam 13. In this embodiment, island body 1 may be fabricated by injecting uncured thermoplastic foam into a mold, and allowing it to form a combination of open and closed cells during curing within the mold. The ratio of open and closed cells may be varied between different zones within the island body. For example, some zones may be made more buoyant by extruding foam with a higher than average percentage of closed cells; other zones may be made more hydrophilic by extruding foam with a higher than average percentage of open cells. The ratio of open to closed cells may be varied by using multiple extrusion devices (with different open/closed cell ratio outputs) simultaneously to make a single island. Alternately, the ratio of open to closed cells may be varied by using a single extruder, by varying the operating conditions of the extrusion process (e.g., by varying the volume and pressure of the expansion gas). Also shown are optional bedding pockets 42, which may be molded into island body 1 and filled with bedding mix 14. This embodiment is well suited for mass production.

Figure 5:
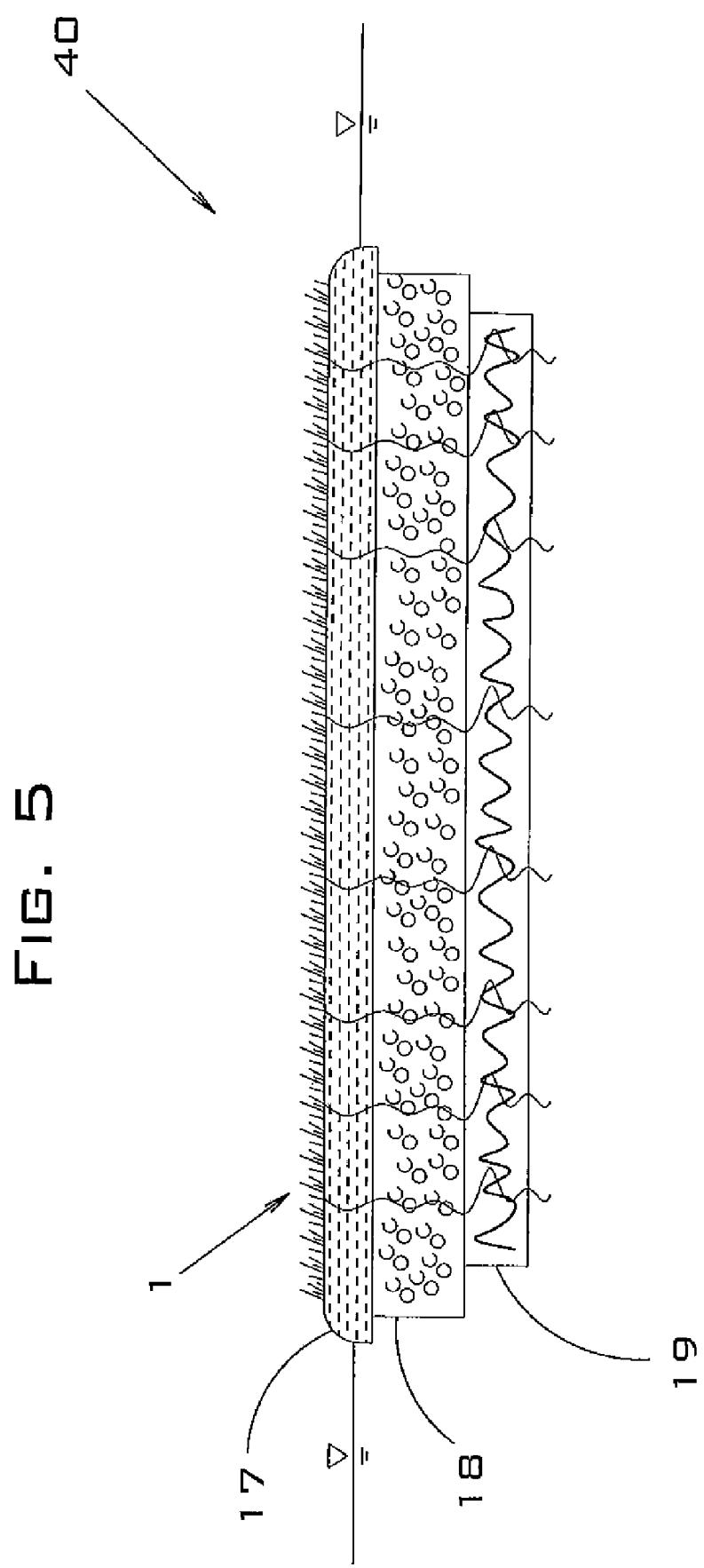
FIG. 5 is a side cross-section view of yet another low-cost embodiment of a floating island.

Referring to FIG. 5, another low-cost embodiment of floating island 40 is presented. In this embodiment, island body 1 is comprised of grass sod layer 17, buoyant matrix material 18 and an optional layer of nonwoven matrix material 19. The soil within sod layer 17 traps rising gas bubbles that are generated within island body 1, or otherwise are introduced into island body 1 (e.g., by an aerator). Optional nonwoven matrix layer 19 provides an extended zone for plant root growth, in which the roots are protected from grazing by fish or other animals. This option may be desirable for applications where islands with large plants are deployed in ponds containing animals that eat the plant roots.

Buoyant matrix layer 18 may be comprised of: (a) thermoplastic polymer shapes (threads, sheets, or solid molded piece), which are buoyant, or (b) thermoplastic polymer foam shapes, which are very buoyant, or a combination of (a) and (b). Foam comprises trapped gas bubbles and is therefore more buoyant than shapes made from the same material that do not contain gas bubbles. In addition to providing buoyancy to island body 1, buoyant matrix layer 18 traps soil particles, thereby preventing the loss of soil from sod layer 17.

Figure 6:
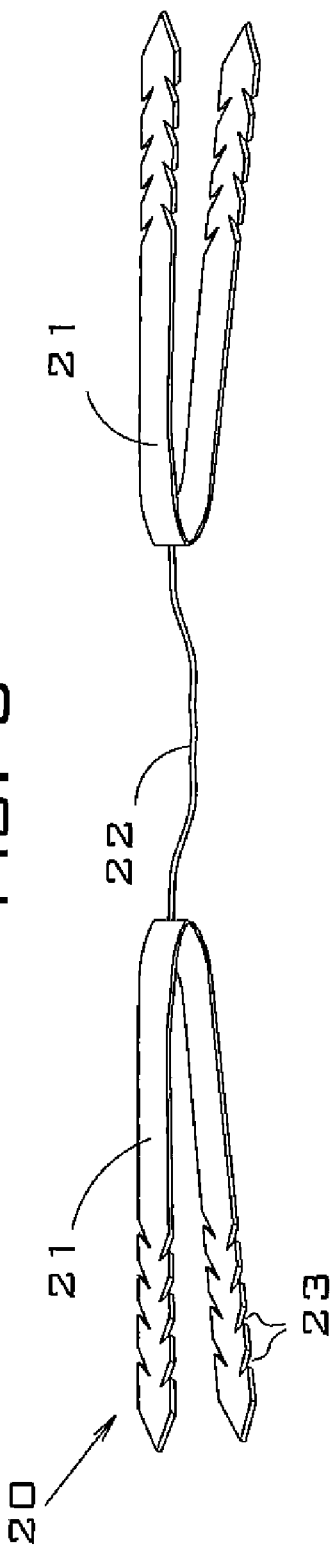
FIG. 6 is a perspective view of a preferred embodiment of a fastening assembly.

Referring to FIG. 6, a preferred embodiment of fastening assembly 20 is presented. In this embodiment, fastening assembly 20 is comprised of two or more fastening pins 21 and connecting cable 22. Fastening pins 21 are preferably formed of any suitably stiff and durable material such as aluminum, stainless steel, mild steel, or nylon. Connecting cable 22 is preferably made from any suitable strong and durable material such as stainless steel cable or nylon rope. This device is preferably used to connect two or more floating islands 40 together laterally, thereby effectively forming a large island. Fastening assembly 20 is preferably installed by pushing fastening pin 21 into the side of an island. Notches 23 in pin 21 catch the strands of the matrix material and lock fastening pin 21 into place. Another fastening pin 21 that is part of fastening assembly 20 is pushed into a second floating island, thereby attaching the two islands.

Figure 7:
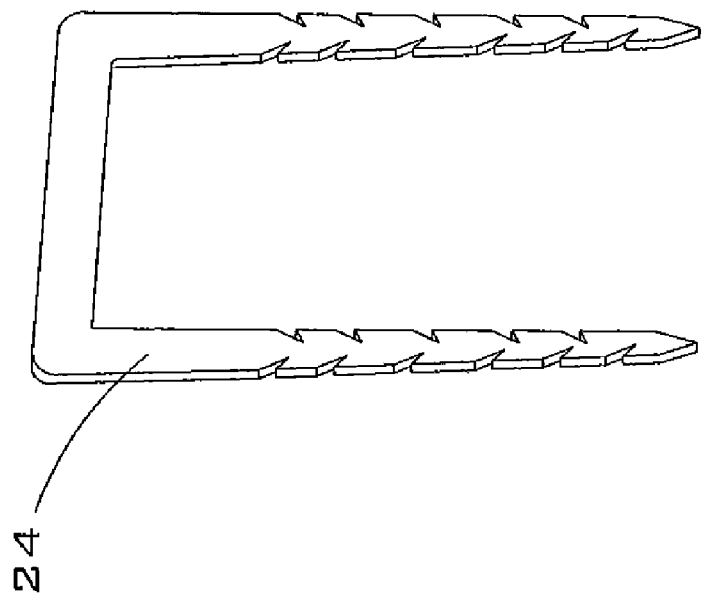
FIG. 7 is a perspective view of a preferred embodiment of a fastening assembly.

Referring to FIG. 7, a preferred embodiment of fastening unit 24 is illustrated. This device may be used to join vertically stacked layers of island body material, to attach additional buoyant units from below, or to attach accessories such as wind powered aerators to the surface of floating island 40. Fastening unit 24 is preferably made from any suitable stiff and durable material such as aluminum, stainless steel, mild steel or nylon. The device is preferably made so that it can be pushed into island body 1 by either hand pressure or foot pressure.

Figure 8:
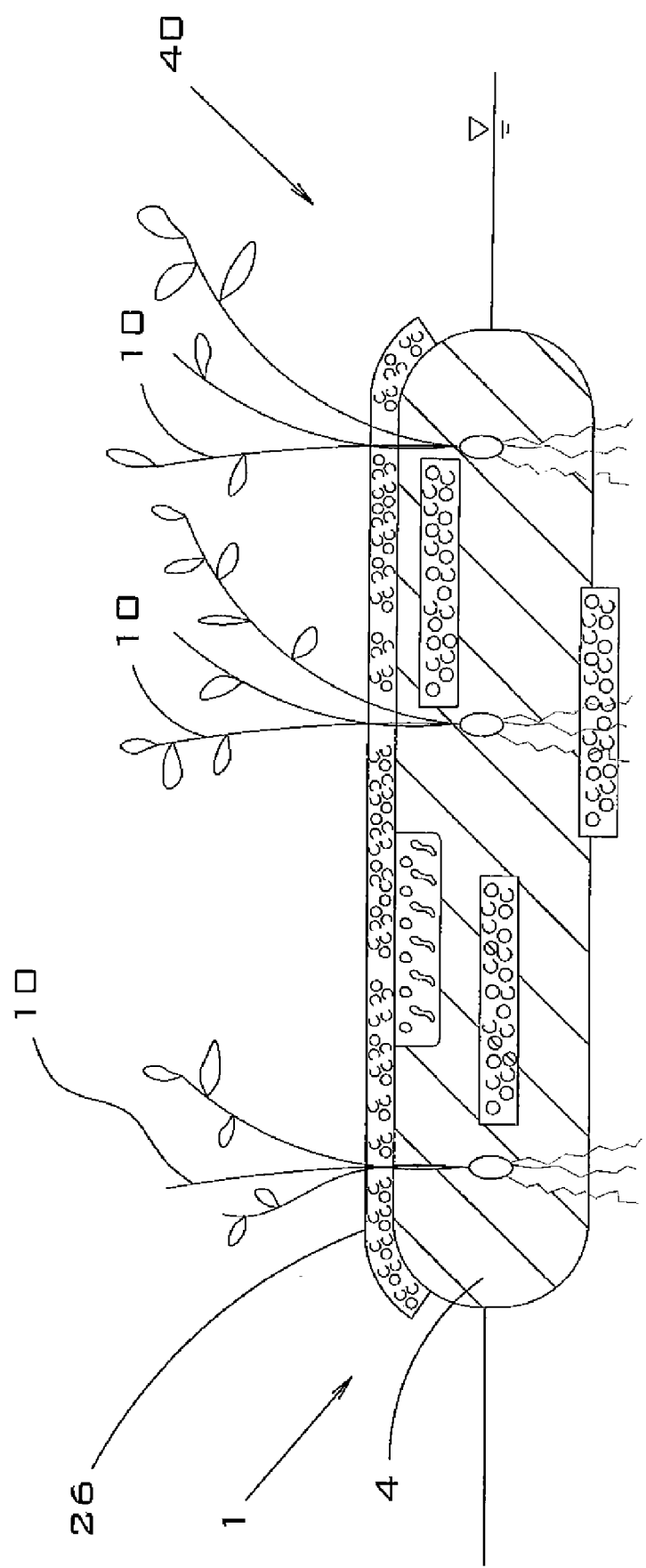
FIG. 8 is a side cross-section view of an embodiment of a floating island that comprises a thermoplastic foam top cover, in which the thermoplastic foam is comprised of both open and closed cells.

Referring to FIG. 8, an embodiment of floating island 40 is shown that comprises thermoplastic foam top cover 26, which is preferably comprised of a thermoplastic foam having both open and closed cells. In this embodiment, island body 1 is preferably comprised of matrix 4 and thermoplastic foam top cover 26. Top cover 26 preferably provides sunlight protection to matrix 4 while allowing plants 10 to penetrate it. In this embodiment, top cover 26 is preferably pre-manufactured in sheet form and attached to matrix 4 by polymer adhesive or mechanical fasteners (not shown). Alternately, top cover 26 may be pre-manufactured in a shaped form to enable it to fit closely over the rounded shape of the top of matrix 4, by extruding the uncured foam resin into a shaped mold for curing during the manufacturing process.

Figure 9:
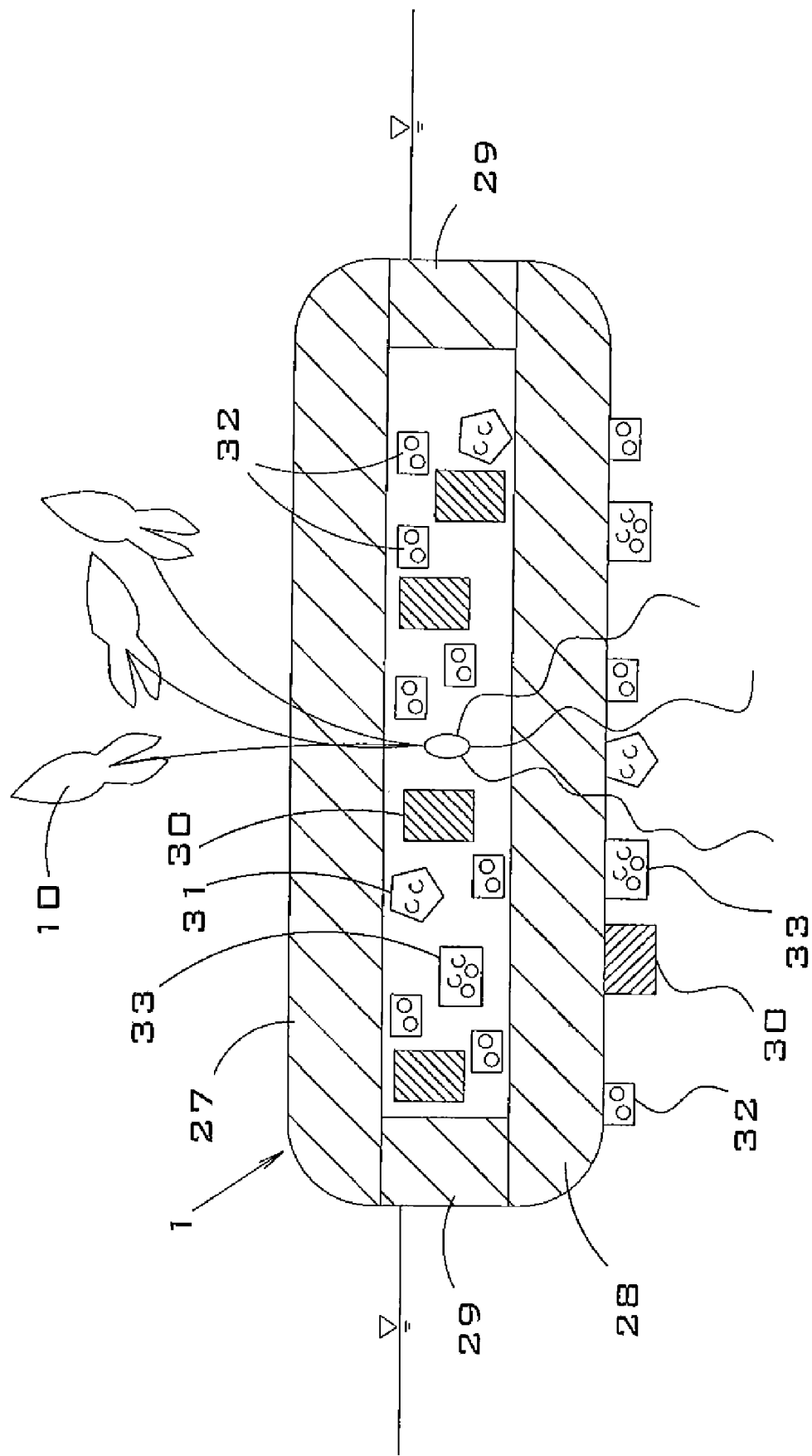
FIG. 9 is a side cross-section view of a preferred embodiment of a floating island that is comprised of a significant percentage of scrap material.

Referring to FIG. 9, a preferred embodiment of floating island 40 is presented that is comprised of a significant percentage of scrap material. In this embodiment, island body 1 is comprised of matrix top 27, matrix bottom 28 and matrix sides 29. The interior portion of the island body 1 is preferably filled with pieces of scrap material that include scrap matrix 30, scrap open cell foam 31, scrap closed cell foam 32, and scrap combination-cell foam 33. Additional scrap material is preferably attached to island body 1 as shown. In this embodiment, buoyancy for the island body 1 is provided by scrap closed cell foam 32 and scrap combination-cell foam 33. The pieces of scrap matrix 30 and scrap open cell foam 31 provide a growth medium for the roots of plants 10, and they also provide additional surface area for growing beneficial microbes.

Figure 10:
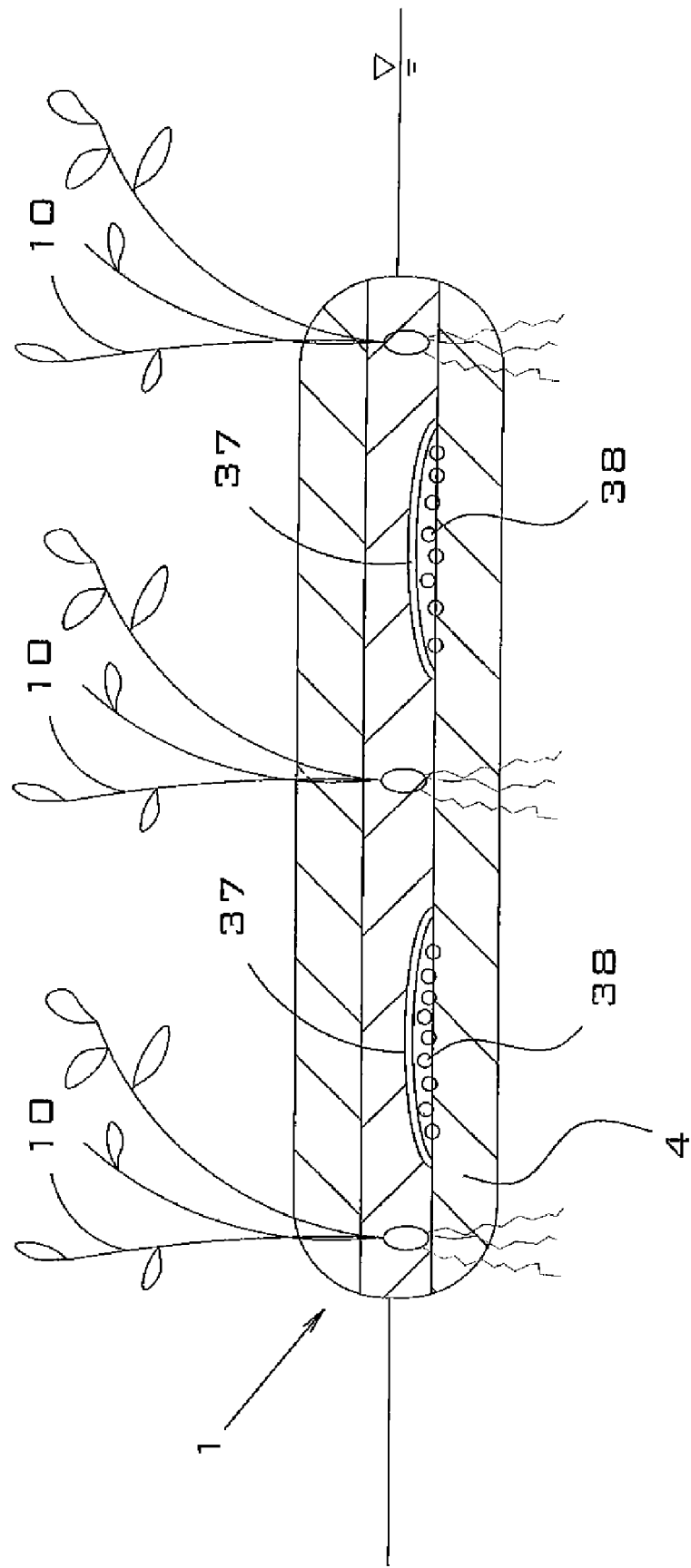
FIG. 10 is a side cross-section view of preferred embodiment of a floating island having gas-trapping inserts.

Referring to FIG. 10, a preferred embodiment of floating island 40 with gas-trapping inserts 37 is presented. In this embodiment, gas-trapping inserts 37 are provided in island body 1. Gas-trapping inserts 37 are installed between layers of matrix 4 during the manufacturing operation of island body 1. Gas-trapping inserts 37 may be made in any suitable shape that traps gas, for example, saucer-shaped (as shown) or flat sheets. Gas-trapping inserts 37 are preferably made from a solid thermoplastic or thermoplastic foam. In the case of thermoplastic foam, the foam is preferably made so as to be substantially closed celled in order to be relatively impermeable to gas. The foam is also preferably made to be penetrable by plant roots. The foam preferably seals around the root penetration holes so as to provide a relatively gas-tight seal around the root penetrations. In this embodiment, gas bubbles 38 rise through gas-permeable matrix 4 until they are blocked by gas-trapping inserts 37. Gas bubbles 38 collect underneath gas-trapping inserts 37 and provide buoyancy to island body 1. Gas bubbles 38 may be produced naturally by microbial metabolism within and beneath island body 1, or they may be produced by mechanical aeration that releases air bubbles beneath island body 1, or by a combination of these sources.

Many variations of the invention will occur to those skilled in the art. Some variations include a shaped liner and wicking cups. Other variations call for gas-trapping inserts. All such variations are intended to be within the scope and spirit of the invention.

Although some embodiments are shown to include certain features, the applicant(s) specifically contemplate that any feature disclosed herein may be used together or in combination with any other feature on any embodiment of the invention. It is also contemplated that any feature may be specifically excluded from any embodiment of the invention.

What is claimed is:

1. A floating island comprising:
    a buoyant matrix layer consisting of a combination-cell thermoplastic foam;
    a grass sod layer that is disposed on said buoyant matrix material.

2. The floating island of claim 1 further comprising:
    a nonwoven matrix layer that underlies said buoyant matrix material.

3. A combination comprising:
    a buoyant matrix layer comprising a combination-cell thermoplastic foam;
    a grass sod layer that is disposed on said buoyant matrix material;
    a nonwoven matrix layer that underlies said buoyant matrix material; and
    a fastening unit embedded in at least two of said layers, wherein the fastening unit comprises a substantially U-shaped, stiff, planar body having a substantially flat top and legs having notches.

4. A floating island comprising:
    a buoyant matrix layer consisting of a combination-cell thermoplastic foam,
    wherein the combination-cell thermoplastic foam comprises closed cells and open cells, and
    wherein the closed cells provide buoyancy and the open cells provide water wicking and water adsorption.

\* \* \* \* \*